United States Patent [19]

Schiekel

[11] 4,359,749

[45] Nov. 16, 1982

[54] RECORDING MEDIUM AND METHOD FOR MAKING A RECORD ON THE RECORDING MEDIUM

[75] Inventor: Manfred Schiekel, Ulm, Fed. Rep. of Germany

[73] Assignee: Licentia Patent-Verwaltungs-GmbH, Fed. Rep. of Germany

[21] Appl. No.: 225,659

[22] Filed: Jan. 16, 1981

[30] Foreign Application Priority Data

Jan. 19, 1980 [DE] Fed. Rep. of Germany ....... 3001884

[51] Int. Cl.[3] ............................................ G01D 15/34

[52] U.S. Cl. ................................ 346/135.1; 346/76 R

[58] Field of Search .............. 346/135.1, 76 R, 76 PH

[56] References Cited

U.S. PATENT DOCUMENTS

| | | | |
|---|---|---|---|
| 3,441,940 | 4/1969 | Salaman et al. | 346/135.1 X |
| 3,789,425 | 1/1974 | Matshushima | 346/135.1 |
| 3,831,179 | 8/1974 | Brill et al. | 346/135.1 X |
| 3,861,952 | 1/1975 | Tokumoto et al. | 346/135.1 X |
| 4,305,082 | 12/1981 | Kusakawa et al. | 346/135.1 |

*Primary Examiner*—G. Z. Rubinson
*Assistant Examiner*—W. J. Brady
*Attorney, Agent, or Firm*—McGlew & Tuttle

[57] ABSTRACT

A recording medium of the type having a first coat which is discolorable by the limited application of heat in a limited area includes a second coat of a material having heat-conducting and electrically insulating properties applied on the first coat and a third coat of a material which is electrically conductive applied on the second coat. The third coat is removable in a limited area by the action of an electric arc which is limited in time and area. A record is made on the recording medium by a technique which includes the steps of igniting an electric arc between the third coat and an electrode, maintaining the electric arc until an opening is formed in a portion of the third coat corresponding to the shape of the electrode, and heating the second coat through the opening to an extent that the amount of heat passing into the first coat from the second coat adjacent the opening causes permanent discoloration of the first coat.

16 Claims, 5 Drawing Figures

RECORDING MEDIUM AND METHOD FOR MAKING A RECORD ON THE RECORDING MEDIUM

FIELD AND BACKGROUND OF THE INVENTION

The present invention concerns an information recording medium of the type having a first coat, which can be discolored in certain areas corresponding to the area-limited action of heat. The invention also concerns a non-mechanical recording method for making a record on such a recording medium.

In known non-mechanical electronic recording methods, a thin metal coat is burned away in a limited area on a dark paper by means of a well-contacting pin electrode, due to the passage of current. With a buildup time of the arc of about 0.5 μs and a burning time of about 10 μs, very high recording powers of up to about 100 kHz are obtained. The relatively long burning times required to obtain high optical contrast conditions disadvantageously leads to a relatively great consumption of the writing electrode. Therefore, in order to obtain a longer service life, self-adjusting electrodes are used. The use of self-adjusting electrodes typically limits the three-dimensional resolution in a multi-electrode arrangement for reasons of mechanical stability to about 2.5 lines per millimeter.

In another single-stage method, the so-called "thermo-reactive method", paper is impregnated with the colorless mixture of two chemical compounds, for example, (a) triphenylmethane-naphthalide and (b) biphenol A. A resistance-heated, well-contacting pin electrode generates local temperature fiels equal to or greater than 300° C. At this temperature, a thermal reaction takes place between the two components, (a) and (b), so that, in the forementioned example, a deep blue compound (c) is obtained. Typical heating times for a temperature of 380° C. are about 5 μs with thermal pressure heads in thin-film technique, the local resolution is about five lines per millimeter.

A disadvantage of this high degree of heat application is that the temperature rises slowly, so that an increasingly stronger annoying background coloration is obtained. In addition, the method is too slow.

SUMMARY OF THE INVENTION

The present invention is directed to a novel recording medium which permits a novel improved recording method relative to the known methods.

This problem is solved, according to the invention, by providing a second coat applied on the first coat, which has heat-conducting and electrically insulating properties, and further providing an electrically conductive coat applied on the second coat which can be removed in limited areas by the action of an electric arc which is limited in time and area. With the above-described recording medium and the above-described method, it is possible to record information rapidly and with a constant good optical appearance.

Accordingly, it is an object of the present invention to provide a recording medium of the type having a first coat which is discolorable in a limited area by area-limited heating and includes a second coat applied on the first coat, the second coat including a material which has heat-conducting and electrically insulating properties and a third coat applied on the second coat, the third coat including a material which is electrically conductive, and the third coat being removable in a limited area by the action of an electric arc which is limited in time and area.

In accordance with the teachings of the invention, a record is made on a recording medium by a technique which includes the steps of igniting an electric arc between the third coat and an electrode, maintaining the arc until an opening is formed in a portion of the third coat corresponding to the shape of the electrode, and heating the second coat through said opening to an extent that the amount of heat passing into the first coat from the second coat adjacent the opening causes permanent discoloration of the first coat.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings.

FIGS. *2a* to *2c* show various stages of a recording process, according to the invention.

DESCRIPTION OF THE PREFERRED EMBODIMENT

Figure 1:
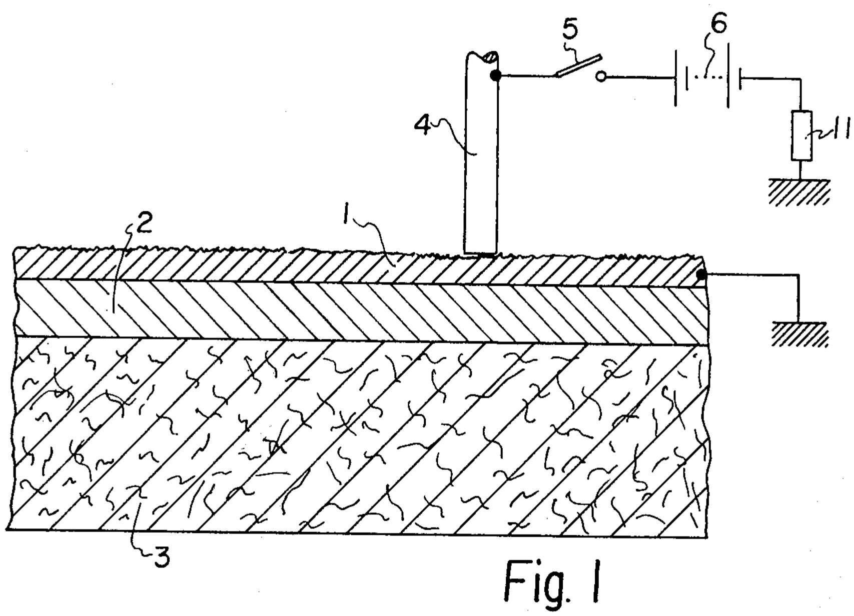
FIG. 1 shows the structure of a recording medium according to the present invention.

In FIG. 1, there is illustrated a thin metal coat 1, a heat-conducting and electrically insulating coat 2 and a coat 3 which can be discolored by the action of heat. Coat 1 is preferably composed of aluminum and has a thickness ranging from 0.02 micron to 2 micron, preferably 0.08 to 0.2 micron, particularly 1 micron.

Coat 2 is composed of an oxide, such as aluminum oxide, and has a thickness of 0.1 micron to 2 micron, preferably 0.5 micron to 2 micron, and particularly about 1 micron. Coat 2 can coincide with coat 3, if necessary, namely, when substrate paper 3 was impregnated with the oxide ($TiO_2$, $Al_2O_3$)—as a suspension—on one side to a depth, for example, of 1 micron. This technique is known as the "spreading method".

Coat 3 is preferably designed as a substrate and is preferably composed of a paper containing pigments or compounds which discolor at elevated temperatures, or both. The paper is preferably impregnated with a mixture of two or more chemical compounds which react with each other at higher temperatures, preferably above 200° C., and produce a color that contrasts sharply with the basic color of the paper. The paper preferably has a thickness ranging from 10 micron to 200 micron, more preferably 20 to 150 micron, and particularly, from about 40 micron to 80 micron.

The writing electrodes 4, a plurality of which are provided side-by-side in the form of a comb arrangement, has preferably a diameter or square cross-section of 0.1 mm to 1 mm, particularly about 0.2 mm. The written information is visible on the surface of paper substrate 3. The recording medium is thus written-on from the "back". The writing electrodes thus do not hinder the view of the character being formed.

Figure 2A:
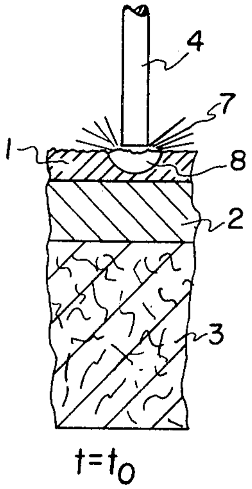
Figure 2B:
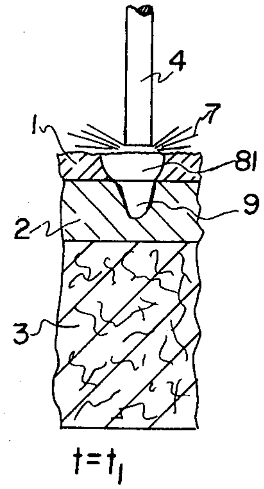
Figure 2C:
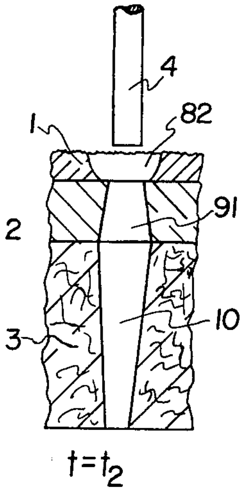
Figure 3:
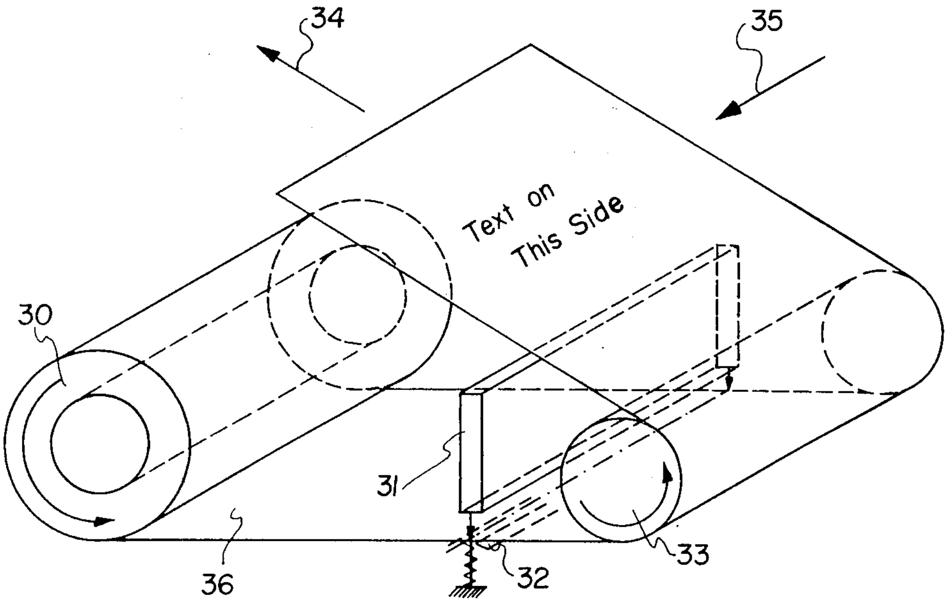
FIG. 3 schematically shows a recording apparatus according to the invention.

In contrast to the known electro-sensitive recording method, metal coat 1 of recording medium 36 is remote from the viewer, while paper substrate 3, impregnated with the color components, faces the viewer. Writing comb 31 presses against a spring contact strip 32 on the inside of the apparatus, as shown in FIG. 3. In FIG. 3, there is shown a supply reel 30 and a take-up reel 33. Arrow 34 indicates the direction of motion of the paper, and arrow 35 indicates the viewing direction of the viewer. Writing comb 31 has a plurality of separately controllable electrodes 4 arranged side-by-side in a row, as shown in FIGS. 1 to 2*c*.

According to the invention, the recording is effected in the form of picture dots applied in a raster on a multilayered recording medium in substantially simultaneous steps as follows. At the time $t=0$ (FIG. 2*a*), a voltage of $U>U_f$ is applied on a pin electrode 4. After contraction of the current paths, a metal vapor arc 7 is then formed in about $10^{-7}$ s which is limited by a series resistance 11 in the circuit which includes a switch 5 and power source 6.

In the time $t_1 \approx 10^{-5}$ s (FIG. 2*b*), the arc burns a parabolic channel 8, 81, 82 into the thin metal coat 1, and is disconnected at the time $t_2$. The intermediate coat 2 prevents arc 7 from spreading to the pigmented paper substrate 3, thereby, causing neither irregular color changes nor metal deposits. Both effects could result in an unclear optical picture of the recording. Intermediate coat 2 need not be very thick (only a few microns) and it has good thermal conductivity and poor electrical conductivity (e.g., $TiO_2$, $Al_2O_3$, and similar metal oxides).

Due to the high gas temperature in arc 7, a "hot spot" 9 is formed in intermediate coat 2 in a very short time of about $10^{-6}$ s. The hot spot 9 turns into a "hot channel" 91 and heats volume element 10 of paper substrate 3 provided with reactive substances in the further course of about $10^{-5}$ s, far above the swelling temperature of about 300° C. The erosion depth in substrate 3 and, lastly, the diameter of the picture dots in substrate 3 can be influenced by the burning time of arc 7. This burning time can be controlled in a known suitable manner (pulse length modulation) with a semiconductor circuit. With the given resolution, determined by the number of electrodes per unit of length, the blackable area of the picture dots, which, as mentioned above, can be adjusted by modulating the pulse length, is a measure of the mean half-tone of a partial area of the picture. In this way, halftone pictures with 4 . . . 6 binary shades of gray, that is, contrast ratios of 1:16 to 1:64, are possible.

The method and the respective paper are not limited to monochromatic pictures. Thus, with the reaction partners triphenylmethane-naphthalide and bisphenol A, a blue-black color is obtained. Other reaction partners of bisphenol A are known which lead, for example, to the colors green, red, yellow or black. The swelling temperatures of the reactions leading to the various colors vary slightly. Thus, by incorporating several different pigments in the same thermoreactive paper substrate, it can be achieved, according to a further development of the invention that, due to the very exact dosability of the temperature field, different colors can be produced on electronically selectable electrodes by selecting the burning time of the arc. It should be noted that when the color with the higher swelling temperature of the reaction partners, for example, of stage 2, is selected, the color of the lower stage 1, in terms of temperature is also excited, so that subtractive mixed colors are obtained.

Thus, the invention is directed to a recording medium with a first coat which is discolorable in a limited area by area-limited heat action and is characterized by a second coat, applied on the first coat, which has heat-conducting and electrically insulating properties, and by an electrically conductive coat, applied on this second coat, which can be removed in a limited area by the action of an electric arc, that is limited in time and area. The first coat is designed as a mechanical carrier for the other coats. The first coat is preferably a paper-type coat and contains and materials which discolor under the action of heat or which react with each other under discoloration. According to a further feature of the invention, the second coat is so resistant to the action of the arc, compared to the first coat, that it is not markedly removed by the action of the arc.

The second coat is preferably composed of a metal oxide, for example, titanium oxide, aluminum oxide or beryllium oxide. The second coat has a thickness of 0.1 micron to 2 micron, and preferably 0.5 micron to 2 micron. The electrically conductive coat is a metal coat, for example, an aluminum coat and has a thickness of 0.02 micron to 2 micron, and preferably 0.08 micron to 0.2 micron.

In accordance with the invention, a method for making a record on a recording medium of the type described is characterized in that an electric arc is ignited between the electrically conductive coat and an adjacent electrode, and is maintained so long that the metal coat is removed corresponding to the shape of the electrode, and that the underlying coat, without being substantially removed, is heated to such an extent corresponding to the shape of the opening in the metal coat, that the amount of heat passing over into the first coat from this heated area causes permanent discoloration of the first coat.

While a specific embodiment of the invention has been shown and described in detail to illustrate the application of the principles of the invention, it will be understood that the invention may be embodied otherwise without departing from such principles.

What is claimed is:

1. A recording medium of the type having a first coat which is discolorable in a limited area by area-limited heating, comprising, a second coat applied on the first coat, said second coat comprising a material which has heat-conducting and electrically insulating properties, and a third coat applied on said second coat, said third coat comprising a material which is electrically conductive, and said third coat being removable in a limited area by the action of an electric arc which is limited in time and area and wherein said second coat is more resistant to the action of said electric arc than said first coat so that it is not markedly removed by the action of said arc.

2. A recording medium, according to claim 1, wherein said first coat is a mechanical carrier for said second and third coats.

3. A recording medium, according to claim 2, wherein said first coat comprises a paper-type coat and contains materials which discolor under the action of heat.

4. A recording medium, according to claim 1, wherein said second coat consists of a metal oxide.

5. A recording medium, according to claim 4, wherein said metal oxide is selected from the group consisting of titanium oxide, aluminum oxide and beryllium oxide.

6. A recording medium, according to claim 5, wherein said second coat has a thickness of 0.1 micron to 2 micron.

7. A recording medium, according to claim 6, wherein said second coat has a thickness of 0.5 micron to 2 micron.

8. A recording medium, according to claim 7, wherein said third coat is a metal coat.

9. A recording medium, according to claim 8, wherein said third coat comprises the metal aluminum.

10. A recording medium, according to claim 6, wherein said third coat has a thickness of 0.02 micron to 2 micron.

11. A recording medium, according to claim 10, wherein said third coat has a thickness of 0.08 micron to 0.2 micron.

12. A recording medium according to claim 1, wherein said first coat comprises a paper-type coat and contains materials which discolor under the action of heat, said second coat consisting of aluminum oxide.

13. A recording medium, according to claim 12, wherein said second coat has a thickness of 0.1 micron to 2 micron.

14. A recording medium, according to claim 13, wherein said third coat is a aluminum coat.

15. A recording medium, according to claim 14, wherein said third coat has a thickness of 0.02 micron to 2 micron.

16. A method of making a record on a recording medium, as claimed in claim 1, comprising the steps of igniting an electric arc between said third coat and an electrode, maintaining said arc until an opening is formed in a portion of said third coat corresponding to the shape of the electrode, and heating said second coat through said opening to an extent that the amount of heat passing into said first coat from said second coat adjacent said opening causes permanent discoloration of said first coat.

* * * * *